United States Patent

Czajkowski et al.

[11] Patent Number: 5,370,238
[45] Date of Patent: Dec. 6, 1994

[54] REMOTE CONTROL ORGANIZER

[76] Inventors: Julian Czajkowski, R.R. No. 7, River Road, Chatham, Ontario, Canada, N7M 5J7; Eric Watson, 8 Collegiate Drive, Chatham, Ontario, Canada, N7L 4R1

[21] Appl. No.: 989,546

[22] Filed: Dec. 10, 1992

[30] Foreign Application Priority Data

May 4, 1992 [CA] Canada ................................ 2067977

[51] Int. Cl.⁵ .............................................. A47F 7/00
[52] U.S. Cl. .......................................... 211/13; 211/70
[58] Field of Search ................... 211/13, 70; 248/676

[56] References Cited

U.S. PATENT DOCUMENTS

| | | | |
|---|---|---|---|
| 4,712,693 | 12/1987 | Striplin | 211/13 X |
| 4,848,609 | 7/1989 | Meghnot | 211/13 |
| 4,852,746 | 8/1989 | Wells et al. | 211/13 |
| 4,856,658 | 8/1989 | Novak | 211/13 |
| 4,893,222 | 1/1990 | Mintzer | 211/13 X |
| 4,991,817 | 2/1991 | Von Kleist et al. | 211/13 X |
| 4,991,892 | 2/1991 | Burrell | 211/13 X |
| 5,042,670 | 8/1991 | Timberlake | 211/13 |
| 5,127,615 | 7/1992 | Jones | 211/13 |
| 5,192,042 | 3/1993 | Wotring et al. | 211/13 X |

*Primary Examiner*—Alvin C. Chin-Shue
*Assistant Examiner*—Sarah A. Lechok

[57] ABSTRACT

A remote control organizer, with releaseable attachment for securing and supporting a plurality of remote control units, while said remote control units are in use, which control electronic entertainment equipment, comprising of two structural members, one disposed on the other forming an internal storage cavity for a television program guide and a suitable location for securing and supporting a cable channel guide. Said organizer having handle portions to provide a single hand grasping and pick up without the accidental pushing of buttons on said remote control units.

6 Claims, 4 Drawing Sheets

REMOTE CONTROL ORGANIZER

The present invention relates generally to an article of manufacture to be used in conjunction with electronic entertainment equipment. More particularly, said article relates to organizing multiple hand held remote control units, while in user for controlling television, video cassette recorder, and stereo component equipment (compact disc players, stereo receivers, etc.). In addition, said article of this invention has provision for storage of television program guide and location for cable channel guide.

It is common for users of electronic entertainment equipment to handle multiple remote control units for said equipment as well as television program guides and cable channel guides at essentially the same time, therefore resulting in unnecessary complexity of handling said remote controls and guides. Said complexity commonly results in misplacement and also potential damage of said remote controls and guides. Said misplacement and potential damage is further enhanced in the presence of unsupervised pets and small children.

The disadvantages of remote control holders, as defined in the following U.S. patents are:

i) In U.S. Pat. No. 5,042,670 to Timberlake, the geometry of the rack structure is limited to supporting only two remote controls as well as limits the compatibility to universally receive remote controls of diverse shapes and sizes. The strap fastening means for remote control fastening is restrictive with regards to having the remote control buttons exposed for use. The basic geometrical layout creates an article which is expensive to manufacture and does not address the need for ease of mobility to place the said rack out of reach of unsupervised pets and small children. The side by side orientation of television program guide, remote control support and video cassette recorder tape support creates a placement area requirement for said rack which is not compact. Although the television program guide is exposed for use, said guide is also exposed to become easily damaged.

ii) In U.S. Pat. No. 4,911,892 to Burrell, although the holder is cost effective to manufacture, any one of the disclosed embodiments is unduly restrictive due to the pre-selected number of fastening faces for remote controls. Furthermore, the disclosed embodiments are only intended for use in the operator's hand, requiring the operator to move said holder from its' normally stored position and orientating the said article to access the desired remote control and further orientation for its' use. Although partially addressed, we believe this excessive manipulation would result in accidental pushing of buttons on said remote controls. Burrell also discloses embodiments for accepting literature that would require excessive handling while retrieving and storing the said literature. Said excessive handling would also result in accidental damage to said literature. Yet another disadvantage of Burrell's disclosed embodiments is poor stability in the stored position due to the high center of gravity and lack of anti-skid feet.

iii) In U.S. Pat. No. 4,991,817 to VonKleist et al., has disclosed a caddy where the principal structure comprises of four separate members which need to be structurally joined together resulting in an unduly complex assembly creating unnecessary cost. Vonkleist et al. was remiss in addressing the need for easy mobility and use in hand with regards to single hand pick up from the surface on which the caddy rests without accidentally pushing the buttons on the fastened remote controls on said caddy. VonKleist et al. discloses a storage compartment for an entertainment guide of which defined geometry results in undue restriction to the depth of said insertion being a fraction of the overall cavity depth due to the thickness of the said guide. As the thickness of the said guide increases, the allowable said insertion depth decreases resulting in less utilization of the said storage compartment. Also, as the said utilization of the said storage compartment decreases, the likelihood of accidental damage to said guide and its' ease of fall-out during handling of said caddy increases. Furthermore, the disclosed opening of the said storage compartment also results in ease of fall-out of said guide of any size during handling of said caddy.

iv) In U.S. Pat. No. 4,911,389 to Self, has disclosed a bracket assembly with side rails which does not address the need for easy mobility and use in hand with regards to single hand pick up from the surface on which the said bracket assembly rests without accidentally pushing the buttons on the adhered instruments on said bracket assembly. Self also did not consider the need for literature storage. We have found the disclosed geometry to be wasteful in the use of "Velcro". The disclosed embodiment of the bracket assembly is unduly limited due to the relationship of the number of fingers, shapes and sizes of instruments and variable locations of battery compartments thereon, increasing the risk of the instrument "Velcro" portions bridging the joints of said battery compartments thereby making battery changes difficult and the need to replace the "Velcro" due to the degradation of the said "Velcro" adhesive on disassembly. Another limitation of Self's embodiments is the requirement to have at least one instrument bridge at least one finger on each subunit thereby restricting users' choice for instrument positioning. Other disadvantages of Self's disclosed embodiments are poor stability while resting on its' support surface due to the lack of anti-skid feet and potential marring on its' support surface due to the lack of anti-marring feet.

v) In U.S. Pat. No. 4,856,658 to Novak, has disclosed a holder for remote control units, said holder is unduly complex in its' use of interlocking teeth to adjust to the width of the said remote control unit and its' use of mortise and mating tenon to join holders for extra said remote control units and therefore the number of component members are excessive. Novak also did not consider the need for literature storage. Other disadvantages of Novak's embodiments are poor stability while resting on its' support surface due to the lack of anti-skid feet and potential marring on its' support surface due to the lack of anti-marring feet.

vi) In U.S. Pat. No. 4,852,746 to Wells et al., has disclosed an electronic control unit storing apparatus of defined geometry, where each electronic control unit has its' individual exterior cell, the disclosed embodiments do not provide for the averaging of the combined widths of multiple electronic control units, thereby increasing the likelihood of any one electronic control unit not fitting said exterior cell. Furthermore, the said geometry requires the operator to orientate the said apparatus to access the desired said electronic control unit. The manipulation required to obtain the said orientation would result in accidental pushing of buttons on said electronic control units. Wells et al. also discloses embodiments of which an interior cell is capable of receiving articles for storage and when the stored article is literature, excessive handling is required while retreiving and storing said literature (ie. literature curling). Said excessive handling would also result in accidental damage to said literature. Other disadvantages of Wells et. al.'s embodiments are poor stability while resting on its' support surface due to the lack of anti-skid feet and potential marring on its' support surface due to the lack of anti-marring feet.

vii) In U.S. Pat. No. 4,848,609 to Meghnot, has disclosed a device for holding only two separate remote control units. Meghnot also did not consider the need for literature storage. Other disadvantages of Meghnot's disclosed embodiment are poor stability while resting on its' support surface due to the lack of anti-skid feet and potential marring on its' support surface due to the lack of anti-marring feet.

viii) In U.S. Pat. No. 4,838,505 to Lowe, has disclosed a holder for remote controllers, said holder has the same disadvantages as described under U.S. Pat. No. 4,911,892 to Burrell with the exception of anti-skid feet.

ix) In U.S. Pat. No. 4,824,059 to Butler, has disclosed an improved cushioning device for remote control television equipment which unduly limits the compatibility to universally receive remote controls of diverse shapes and sizes. More particularly the open cavity therein adapted to grippingly receive a remote control device will have dimensions such that only a particular family of remote controls having required size will fit the said open cavity. Butler also discloses a pocket for reception of a television program guide that would require excessive manipulation to insert said guide. Said excessive manipulation would also result in accidental damage to said guide.

x) In U.S. Pat. No. 4,815,683 to Ferrante, has disclosed a holder for TV/VCR remote control units, said holder is simply a storage device not intended for receiving remote control units while said remote control units are in use.

xi) In U.S. Pat. No. 4,739,887 to Beach, has disclosed a rack for storing stereo and television remote control devices which has the same disadvantages as U.S. Pat. No. 4,815,683 to Ferrante.

xii) In U.S. Pat. No. 4,712,693 to Striplin, has disclosed a device for supporting remote control units, said device is unduly complex with regards to clutching indexing method, bearings, shaft, base and rotating member for remote control unit mounting. Another disadvantage of said device is that orientation is required to select desired remote control unit and also this manipulation would result in accidental pushing of buttons on said remote control unit. Striplin's disclosed embodiments are also restrictive due to the requirement of the pre-selected number of remote control units. Striplin also did not consider the need for literature storage. Further disadvantages of Striplin's disclosed embodiments are poor stability while resting on its' support surface due to the lack of anti-skid feet and potential marring on its' support surface due to the lack of anti-marring feet.

xiii) In U.S. Pat. No. 4,709,412 to Seymour et al., has disclosed an infrared remote control unit integrator console, said console is unduly complex with regards to detectors, amplifiers and emittors which would become cost prohibitive. Seymour et al. also did not consider the need for literature storage.

xiv) In U.S. Pat. No. 4,660,792 to Rogalski, has disclosed a holder for VCR and TV remote controls, said holder would unduly limit the compatibility to universally receive remote controls of diverse shapes and sizes. Furthermore, the remote control fastening method is restrictive with regards to having the remote control buttons exposed for use due to the diverse shapes, sizes, placement and orientation of remote control buttons. Rogalski also did not consider the need for literature storage.

It is an object of the present invention to provide an article of manufacture which will overcome all of the above said disadvantages in a simple, compact, lightweight, easily handled (highly mobile), durable, low cost manner for use on coffee tables, users' laps, floors, and in users' hands. Accordingly, the present invention comprises: a remote control organizer having releaseable attachment means for securing and supporting a plurality of remote control units of diverse shapes and sizes, while said remote controls are in use; a concealed, protected, generally captive and gravity dispensable storage means for a television program guide; a means for securing and supporting a cable channel guide, independently of other literature, while said cable channel guide is in use; a single hand grasping, pick up and handling means, without the accidental pushing of buttons on said remote controls, thereby providing quick and easy handling (mobility) of said remote control organizer, while said remote control organizer is in use and when placed out of reach of unsupervised pets and small children.

The above and other objects and advantages of the present invention will be better appreciated and understood from the following detailed description and the accompanying drawings.

BRIEF DESCRIPTION OF THE DRAWINGS

Referring to the drawings, wherein like elements are numbered alike in the several FIGURES.

DESCRIPTION OF THE PREFERRED EMBODIMENT

Figure 5:
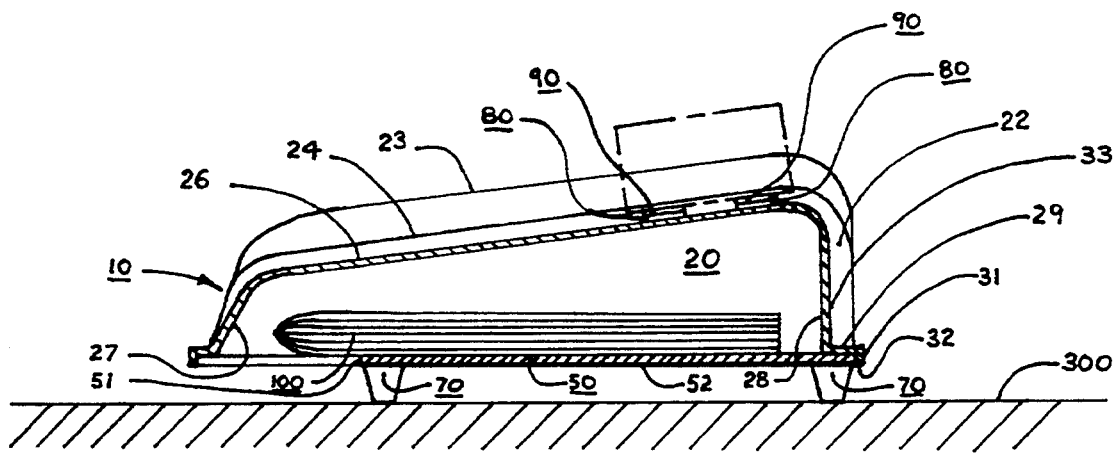
FIG. 5 is a transverse sectional view taken on line 5—5 in FIG.4, of the remote control organizer resting on a horizontal support surface.

Referring to FIGS. 5 to 8, inclusive, the remote control organizer 10 comprises of two major structural components, housing 20 and base 50. Said housing 20 is formed from a single sheet of thermoplastic material by the vacuum thermoforming process. It should be appreciated that the said housing 20 could be produced using other processes, such as injection molding, but it is believed that the vacuum thermoforming process is the most cost effective, especially if initial tooling costs are considered. Base 50 is an essentially rectangular flat planar member which is simply produced by cutting from a flat sheet material. Generally rectangular annular portion 29 having skirt portion 31 is designed to receive and locate said base 50. Said housing 20 and said base 50 are simply joined together using hot melt adhesive (not shown). It should be appreciated that other joining means, such as snap fits, could be utilized. Elastomeric feet 70 are joined at each corner of exposed planar surface 52 of said base 50 with adhesive (not shown), thereby providing anti-skid and anti-mar characteristics to said organizer 10 when resting on horizontal support surface 300, as best illustrated in FIG. 5.

Figure 2:
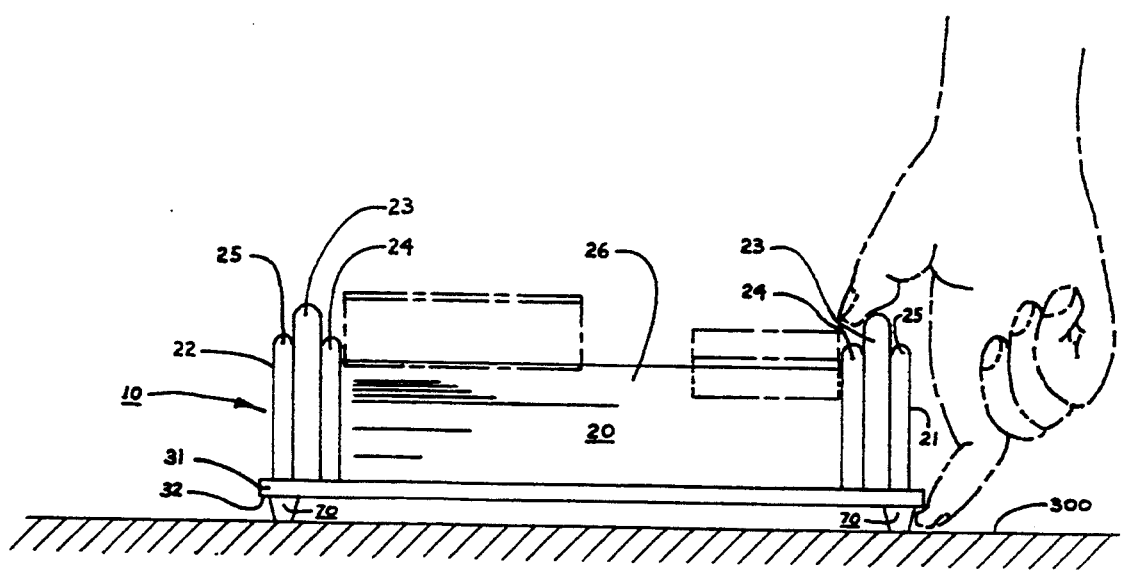
FIG. 2 is a rear elevation view of the remote control organized on a supporting surface, illustrating a single hand grasp of said organizer.
Figure 3:
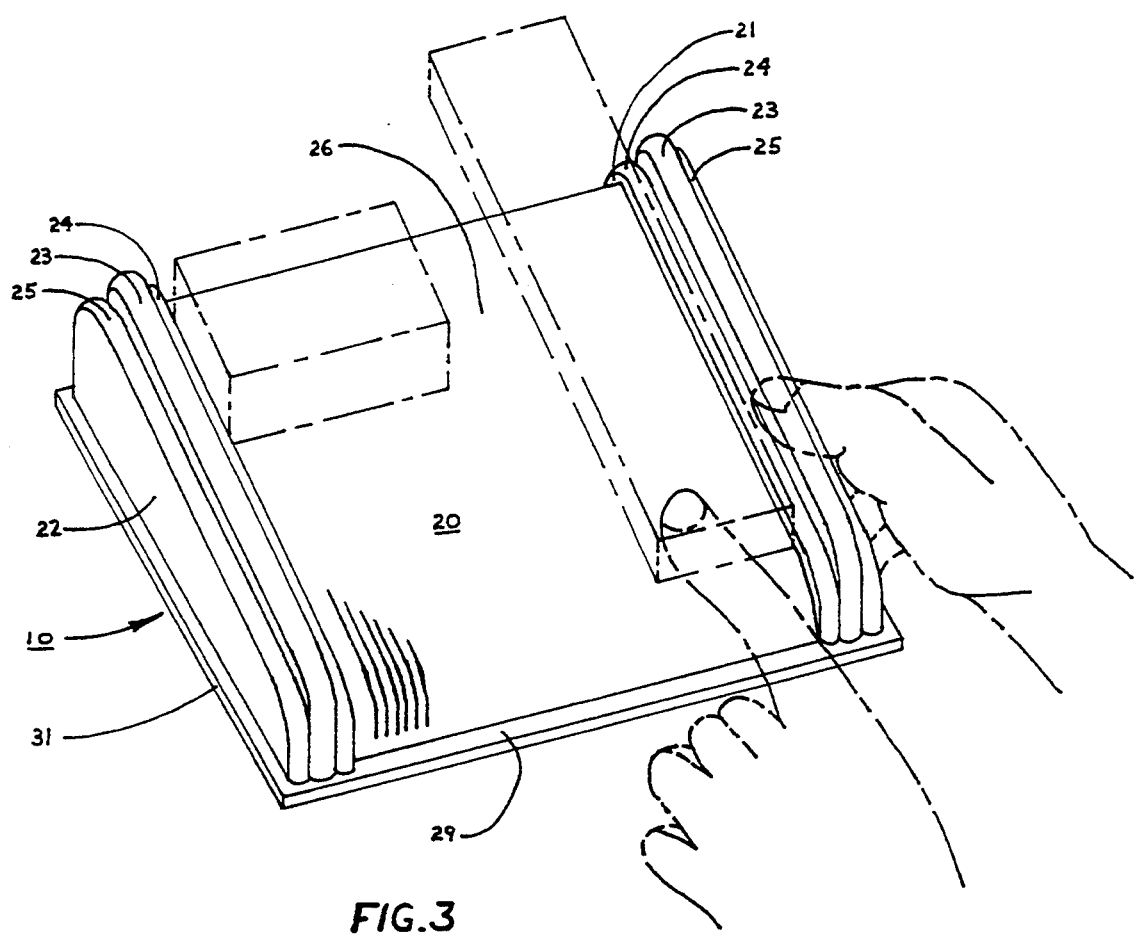
FIG. 3 is a perspective rear view of the remote control organizer in use, a hand held illustration.
Figure 4:
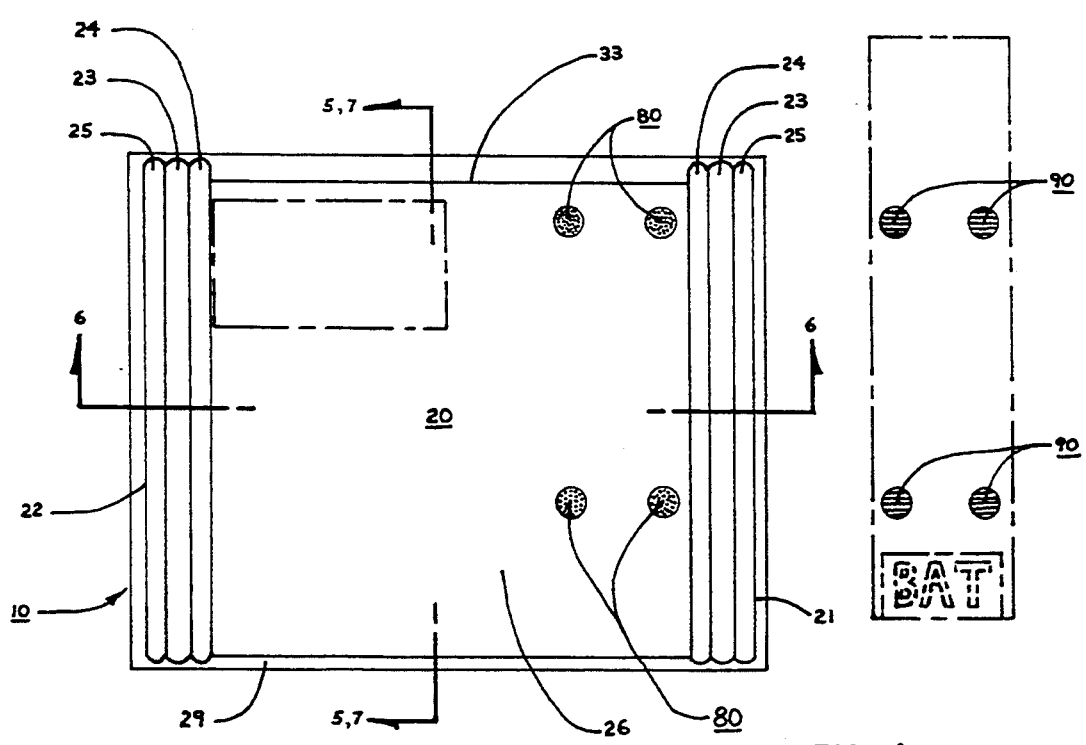
FIG. 4 is a top plan view of the remote control organizer depicting a location of user installed releaseable attachment means.

As best seen in FIGS. 1 to 4, inclusive, generally rectangular surface portion 26 of said housing 20 is designed to support remote control units of diverse shapes and sizes (shown in phantom). There is no practical limitation to the length of said remote control units to be supported on said surface portion 26 since said remote control units may extend outwardly beyond outside front surface 33 of said housing 20, said outside front surface 33 can be best seen in FIG. 1. Again, referring to FIGS. 1 to 4, inclusive, the width of said surface portion 26 is bounded by right handle portion 21 and left handle portion 22 of said housing 20. It should be appreciated, said width can be selected to accomodate any plurality of said remote control units of diverse shapes and sizes. In the interest of compactness it has been determined that said width being approximately eight inches will accomodate the average of the combined widths of the vast majority of the diverse shapes, sizes and quantity of said remote control units normally found in North American households. It should also be appreciated that said surface portion 26 can be inclined at a non-zero angle relative to the plane of said base 50 to enhance user visibility and operation of buttons on said remote control units. Referring to FIG. 4, said remote controls are releaseably attached to said surface portion 26 by user installed "Velcro" hook buttons 80 on said surface portion 26 and "Velcro" loop buttons 90 on the supporting face of said remote controls. It should be appreciated that said "Velcro" loop buttons 90 will not snag users' clothing while using or servicing the said remote control unit independent of said organizer 10. It has been determined that for each of said remote control units, four sets of said "Velcro" hook and loop buttons, 80 and 90, approximately one-half inch in diameter, will provide adequate fastening means to overcome gravity and mechanical shock encountered during normal use of said organizer 10. It should be appreciated said quantity and size of said "Velcro" buttons, 80 and 90, is not wasteful in said useage. It should be further appreciated said user installed "Velcro" loop buttons 90 significantly reduces the risk of bridging the joint between battery compartment cover and body of said remote control unit eliminating the wastage and user inconvenience of removing said "Velcro" loop button 90 during battery replacement of said remote control unit. The positioning of said "Velcro" buttons 80 and 90, as illustrated, are generally concealed from view when said remote control units are installed on said organizer 10, thereby preventing accidental snagging to articles, such as clothing, onto said "Velcro" hook buttons 80.

Figure 6:
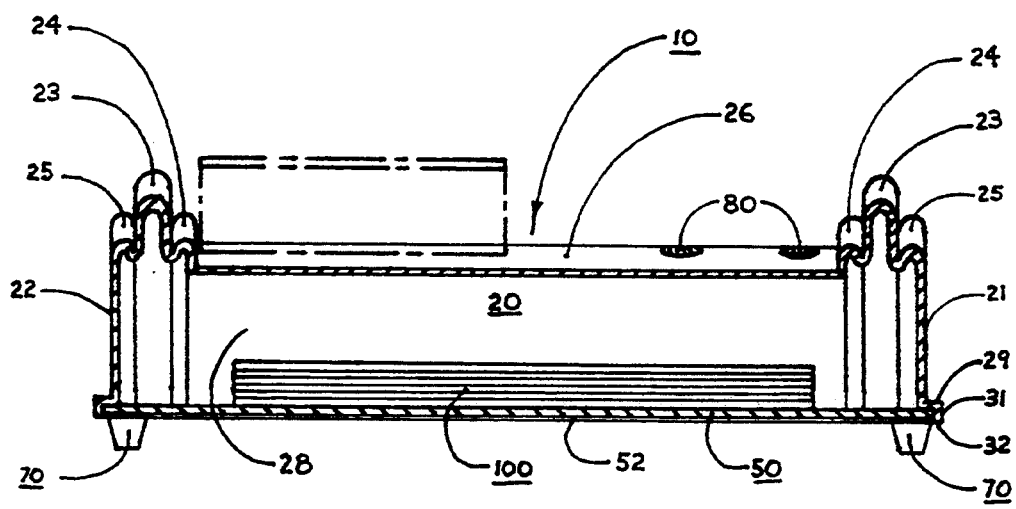
FIG. 6 is a transverse sectional view taken on line 6—6 in FIG.4.

As best illustrated in FIG. 6, said right handle portion 21 and said left handle portion 22 of said housing 20 has an elevated geometry relative to said surface portion 26 providing structural rigidity for said housing 20. It should be appreciated said structural rigidity allows for thinner said sheet useage hence less cost and less weight for said housing 20. Said handle portions 21 and 22 further comprises of rib portions 23, 24 and 25. Said rib portions further enhance said structural rigidity. Center rib portion 23 of said handle portions 21 and 22 is of a higher elevation than inner rib portion 24 and outer rib portion 25. Said rib portions 24 and 25 are essentially of the same elevation.

Referring to FIG. 2, the width of said rib portion 24 guarantees clearance between said rib portion 23 and said user installed remote control units. Said clearance in combination with said higher elevation of said rib portion 23 relative to said rib portion 24 provides an ergonomically acceptable grasping means for the user's thumb, shown in phantom, thereby allowing single hand pick up of the said organizer 10 from horizontal support surface 300 without the accidental pushing of buttons on said remote control units. It should be appreciated said grasping means provides easy and convenient mobility and hand held use of said organizer 10 as best illustrated in FIG. 3. Again referring to FIG. 2, the elevation clearance generated between bottom edge portion 32 of said housing 20 and said support surface 300 is provided by the elevation of said feet 70 further enhances said grasping means of said organizer 10 by allowing the user's fore finger tip, shown in phantom, to grip said edge 32.

Figure 7:
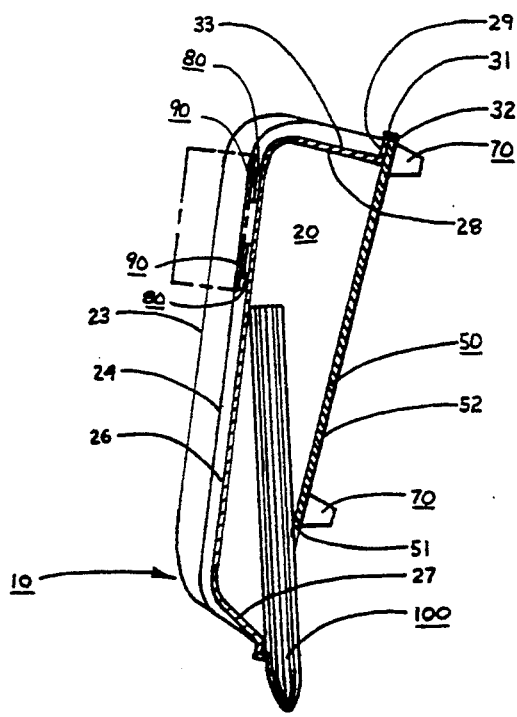
FIG. 7 is a transverse sectional view taken on line 7—7 in FIG.4, of the remote control organizer inclined at an angle approximately 60 to 90 degrees to the horizontal surface, partially dispensed television program guide.
Figure 7:
Figure 8:
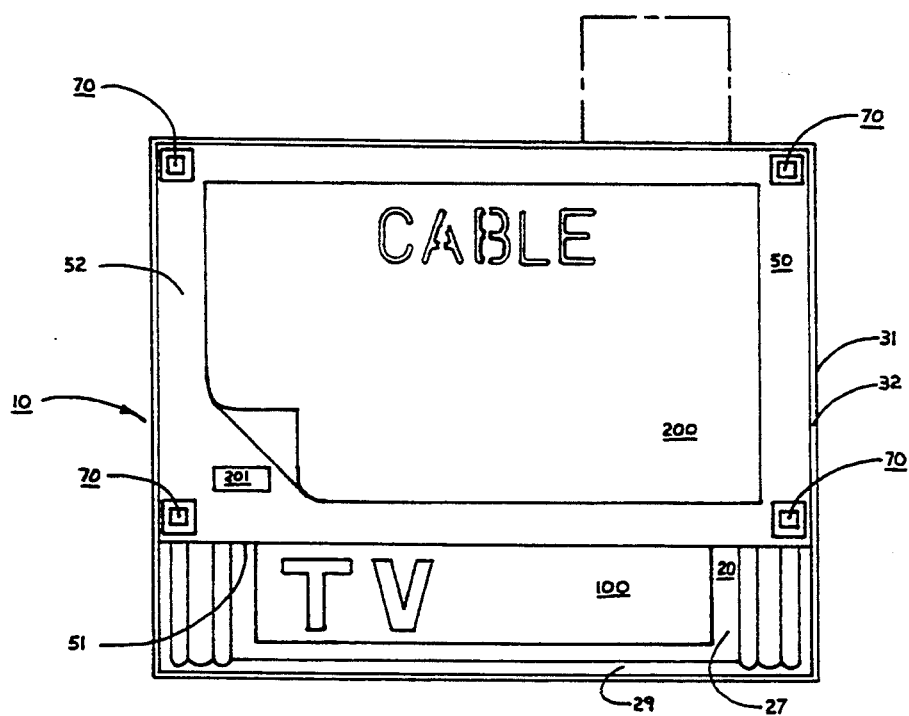
FIG. 8 is a bottom plan view of the remote control organizer depicting a location for securing and supporting a cable channel guide.

Referring to FIGS. 5, 7, and 8, three edge surfaces of said base 50 are essentially in physical contact with said skirt 31. It should be appreciated that said physical contact significantly enhances the structural rigidity of said organizer 10. Exposed edge surface 51 of said base 50 is remotely positioned and essentially parallel to inside rear surface 27 resulting in a rectangular opening between said base 50 and said housing 20 in the same plane as said base 50 for receiving television program guide 100. The space between said housing 20 and said base 50 defines a storage cavity where the elevation of said inside rear surface 27 of said housing 20 with respect to the planar surface of said base 50 and suitable dimensions for said rectangular opening allows for storage of said guide 100 having various thicknesses. It should be appreciated that this geometry provides essentially 100 per cent. utilization of the cross-sectional area of said organizer 10 in the same plane as said base 50 for the storage of said guide 100. It should be further appreciated that said geometry substantially reduces the chance of accidental fall-out of said guide 100 during intended handling of said organizer 10.

With reference to FIG. 7, said rear surface 27 has an inclined angle of about 70 degrees relative to the plane of said base 50. Said inclined angle in combination with said rectangular opening allows for convenient dispensing of said guide 100 from said storage cavity, due to gravity, when said organizer 10 is intentionally tilted to an inclined angle of about 60 degrees to about 90 degrees relative to the horizontal, as illustrated. It should be appreciated that in any other orientation during intended handling of said organizer 10, the guide 100 will be retained in said storage cavity. The said geometry provides concealed, protected, generally captive and gravity dispensable storage means for said guide 100 most often found in North American households.

With reference to FIG. 8, said planar surface 52 of said base 50 provides a rectangular area suitable for supporting user installed cable channel guide 200 by means of double-sided adhesive tape 201, thereby providing additional utility and convenience of said organizer 10.

Figure 1:
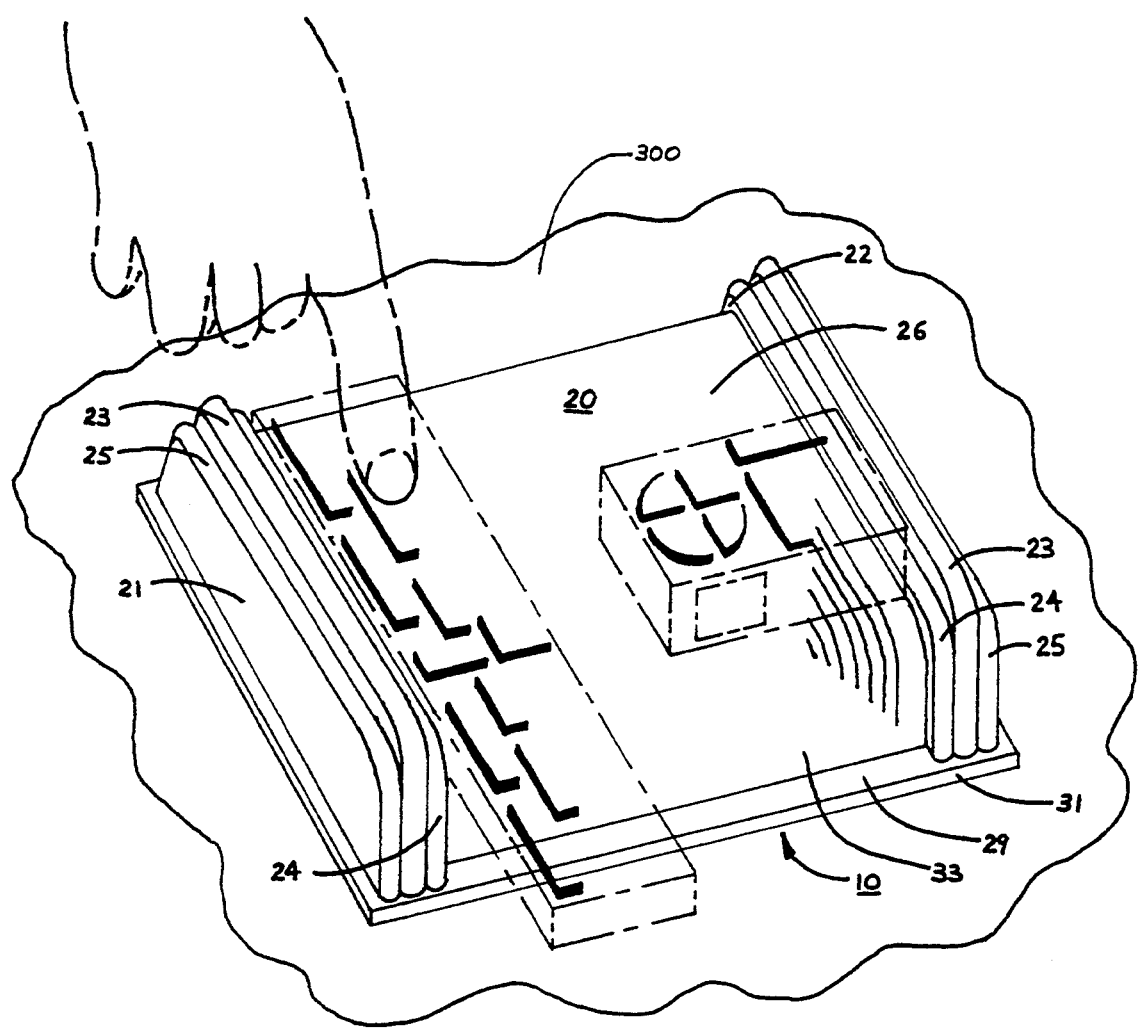
FIG. 1 is a perspective front view of the embodiment of the remote control organizer in use, setting on a supporting surface.

It should be appreciated that the exposed viewed surfaces of said housing 20 as generally seen in FIGS. 1 and 3 as well as said exposed planar surface 52 of said base 50 as seen in FIG. 8 maybe lightly textured to significantly reduce common problems of imperfections and fingerprinting on flat surfaces without a significant negative effect on adhesive bonds.

Said organizer 10 as shown and described is a simple, compact, light-weight, easily handled (highly mobile), durable, low cost remote control organizer for use on coffee tables, users' laps, floors, in users' hands comprising: releaseable attachment means for securing and supporting a plurality of remote control units of diverse shapes and sizes, while said remote controls are in use; a concealed, protected, generally captive and gravity dispensable storage means for a television program guide; a means for securing and supporting a cable channel guide, independently of other literature, while said cable channel guide is in use; a single hand grasping, pick up and handling means, without the accidental pushing of buttons on said remote controls, thereby providing quick and easy handling (mobility) of said remote control organizer, while said remote control organizer is in use and when placed out of reach of unsupervised pets and small children.

Many changes and modifications in the above described embodiment of the invention can, of course, be carried out without departing from the scope thereof. Accordingly, that scope is intended to be limited only by the scope of the appended claims.

We claim:

1. A remote control organizer having a releaseable attachment means for securing and supporting a plurality of remote control units of diverse shapes and sizes, while said remote controls are in use; a concealed, protected, generally captive and gravity dispensable storage means for a television program guide; a single hand grasping, pick up and handling means comprising, in combination:
   a. a housing member having a generally box-like geometry with a top portion, a front portion, a rear portion, two opposed handle portions and a rectangular annular bottom portion, said housing being formed from a single sheet of thermoplastic material via a vacuum thermoforming process, comprising:
      i. said top portion having a rectangular planar geometry terminating integrally at said front, rear and two opposed handle portions and furthermore disposed above said annular bottom portion, said top portion having an exposed planar surface to support a plurality of remote control units;
      ii. said front portion having a generally rectangular geometry terminating integrally at said top, annular bottom and two opposed handle portions, generally perpendicular to and downwardly from plane of said top portion and generally perpendicular to and upwardly from plane of said annular bottom portion;
      iii. said rear portion having a generally rectangular geometry terminating integrally at said top, annular bottom and two opposed handle portions, at an obtuse angle to and downwardly from plane of said top portion and an acute angle to and upwardly from plane of said annular bottom portion;
      iv. said two opposed handle portions, providing left and right handles for said remote control organizer, each said handle terminating integrally with and extending outwardly from said top, front and rear portions and terminating integrally with said annular bottom portion, each said handle having an integrally formed outside vertical generally quadrilateral wall portion and an inside vertical wall portion separated from one another on three outwardly extending sides by an integrally formed multiple-ribbed portion, said multiple-ribbed portion positioned longitudinally from front to rear of said housing having a center rib extending upwardly from adjacent ribs, thereby providing structural rigidity, through geometry, and a guaranteed means of single hand pick up, without accidental remote control unit button pushing, of said remote control organizer;
      v. said annular bottom portion integrally terminating with and extending outwardly from said front, rear and two opposed handle portions, having a right angle cross-section such that the exposed edge extends downwardly thereby providing a receiving and location means; and,
   b. a base member having a generally rectangular planar geometry with a front, rear and two opposed side edges, said front and two opposed side edges being secured within said right-angled cross-section of said annular bottom portion of said housing member such that there is essentially intimate contact along said front and two opposed side edges of said base with said annular portion thereby providing structural rigidity to said remote control organizer;
   c. said remote control organizer having an essentially 100 per cent useable internal storage cavity bounded by said housing member and said base member where said storage cavity is accessed by a generally rectangular opening, said opening lies in the same plane as said base member, bounded by said rear edge of said base member and said annular bottom portion of said housing, in general proximity to said rear portion of said housing, said cavity and said opening provides accessable storage of said television guide, furthermore said rear portion of said housing having said angles in combination with said opening allows for dispensing of said television guide from said storage cavity due to gravity when said remote control organizer is tilted front to back at an inclined angle to about 60 degrees and about 90 degrees relative to the horizontal, thereby providing concealed and protected storage with significantly reduced risk of accidental fall-out of said program guide thereby allowing for highly mobile use of said remote control organizer.

2. The remote control organizer of claim 1, wherein the external surfaces of said organizer are lightly textured.

3. The remote control organizer of claim 1, wherein said front portion has a higher elevation than said rear portion.

4. The remote control organizer of claim 1, further comprising: a plurality of elastomeric feet adhesively bonded to exposed bottom surface of said base member and said feet positioned at four corners on said exposed surface where height of said feet provides a clearance between the bottom edge of said remote control organizer and a planar supporting surface, said clearance allows grasping means of said remote control organizer by human fingers thereby enhancing single hand pick up of said remote control organizer from said supporting surface and furthermore said feet provide anti-mar and anti-skid characteristics to said remote control organizer when positioned on said supporting surface.

5. The remote control organizer of claim 1, further comprising: said exposed surface of said base member in combination with double-sided tape provides a location and releaseable attachment means, respectively, to support said cable guide.

6. A remote control organizer comprising, in combination:

a. a means for securing and supporting a plurality of remote control units, while said remote control units are in use;

b. a concealed, protected, generally captive and gravity dispensable storage means for a television program guide, thereby providing for nonaccidental fall-out of said program guide from said remote control organizer under intended handling conditions of said remote control organizer and further providing easy dispensing of said program guide from said remote control organizer, due to gravity, when said remote control organizer is orientated in a predetermined manner; and, c. a single hand grasping and pick up means without the accidental pushing of buttons on said remote control units, comprising of two opposed handle portions, each providing a left and a right handle for said remote control organizer, each said handle having a multiple-ribbed portion positioned longitudinally from front to rear of said remote control organizer, said multiple-ribbed portion comprising an inner rib with higher elevation than the adjacent remote control unit supporting surface and a lower elevation than the adjoining rib, thereby providing an ergonomically acceptable single hand grasping and pick up means of said remote control organizer without the accidental pushing of buttons on said remote control units.

* * * * *